United States Patent
Religa et al.

(10) Patent No.: US 7,355,926 B2
(45) Date of Patent: Apr. 8, 2008

(54) PORTABLE LOW FREQUENCY PROJECTOR

(75) Inventors: Richard J. Religa, Dartmouth (CA); Richard Alfred G. Fleming, Dartmouth (CA); George K. Schattschneider, Dartmouth (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 154 days.

(21) Appl. No.: 11/293,216

(22) Filed: Dec. 5, 2005

(65) Prior Publication Data

US 2006/0133212 A1 Jun. 22, 2006

Related U.S. Application Data

(60) Provisional application No. 60/637,643, filed on Dec. 21, 2004.

(51) Int. Cl.
*H04R 17/00* (2006.01)

(52) U.S. Cl. .................. 367/175; 367/174

(58) Field of Classification Search ............ 367/169, 367/174, 175
See application file for complete search history.

(56) References Cited

U.S. PATENT DOCUMENTS

| | | | |
|---|---|---|---|
| 4,353,120 A * | 10/1982 | Pickens | 367/142 |
| 4,922,470 A | 5/1990 | McMahon et al. | |
| 5,268,879 A * | 12/1993 | Flanagan | 367/175 |
| 5,805,529 A | 9/1998 | Purcell | |
| 5,959,939 A * | 9/1999 | Tengham et al. | 367/174 |

* cited by examiner

*Primary Examiner*—Ian J. Lobo
(74) *Attorney, Agent, or Firm*—Stites & Harbison PLLC; Ross F. Hunt, Jr.

(57) ABSTRACT

A portable low frequency underwater acoustic projector having two circular diaphragms separated by a spacer ring with a pair of coils and oscillating masses being located in pipes connected to central opening in two diaphragms, the coils driving these masses in opposite directions. Central openings in each diaphragm have an associated pipe extending outward from the interior of the projector, the pipe having closed outer ends. The interior of the projector being gas filled to provide pressure compensation.

10 Claims, 2 Drawing Sheets

PORTABLE LOW FREQUENCY PROJECTOR

This Claims the benefit of PROVISIONAL APPLICATION Ser. No. 60/637,643 filed 21 Dec. 2004.

FIELD OF THE INVENTION

The present invention relates to an underwater acoustic projector having very low frequency and a wide bandwidth.

BACKGROUND OF THE INVENTION

Very low frequency, low cost, wide bandwidth and portability are all desirable assets for underwater acoustic projectors. Present flextensional designs such as the folded shell projector (FSP) taught in U.S. Pat. No. 5,805,529 by Purcell and the barrel stave projector (BSP) as described in U.S. Pat. No. 4,922,470 by McMahon et al are portable but operate at frequencies far above what is required. The DRDC-Atlantic moving coil projector (MCP) operates over the frequency band required but weighs many tons and is not easily deployable. That projector can produce sound levels in excess of 180 dB at 10 Hz.

Presently very low frequency sound sources are created either by using radiating pistons driven by large displacement-high force mechanisms, by airgun driven cavity collapse, by spark induced cavity collapse, by edge driven flexural disk projectors or multi-motor driven flexural disk projectors.

Present low frequency projectors such as the moving coil projector, airgun and sparker are typically heavy and expensive devices.

SUMMARY OF THE INVENTION

It is an object of the present invention to provide an underwater low frequency light weight projector.

DESCRIPTION OF A PREFERRED EMBODIMENT

Very low frequency, low cost, wide bandwidth and portability are all desirable assets for underwater acoustic projectors. Present flextensional designs such as the folded shell projector (FSP) taught in U.S. Pat. No. 5,805,529 by Purcell and the barrel stave projector (BSP) as described in U.S. Pat. No. 4,922,470 by McMahon et al are portable but operate at frequencies far above what is required. The DRDC-Atlantic moving coil projector (MCP) operates over the frequency band required but weighs many tons and is not easily deployable. That projector can produce sound levels in excess of 180 dB at 10 Hz.

Presently very low frequency sound sources are created either by using radiating pistons driven by large displacement-high force mechanisms, by airgun driven cavity collapse, by spark induced cavity collapse, by edge driven flexural disk projectors or multi-motor driven flexural disk projectors.

Present low frequency projectors such as the moving coil projector, airgun and sparker are typically heavy and expensive devices.

Figure 1:
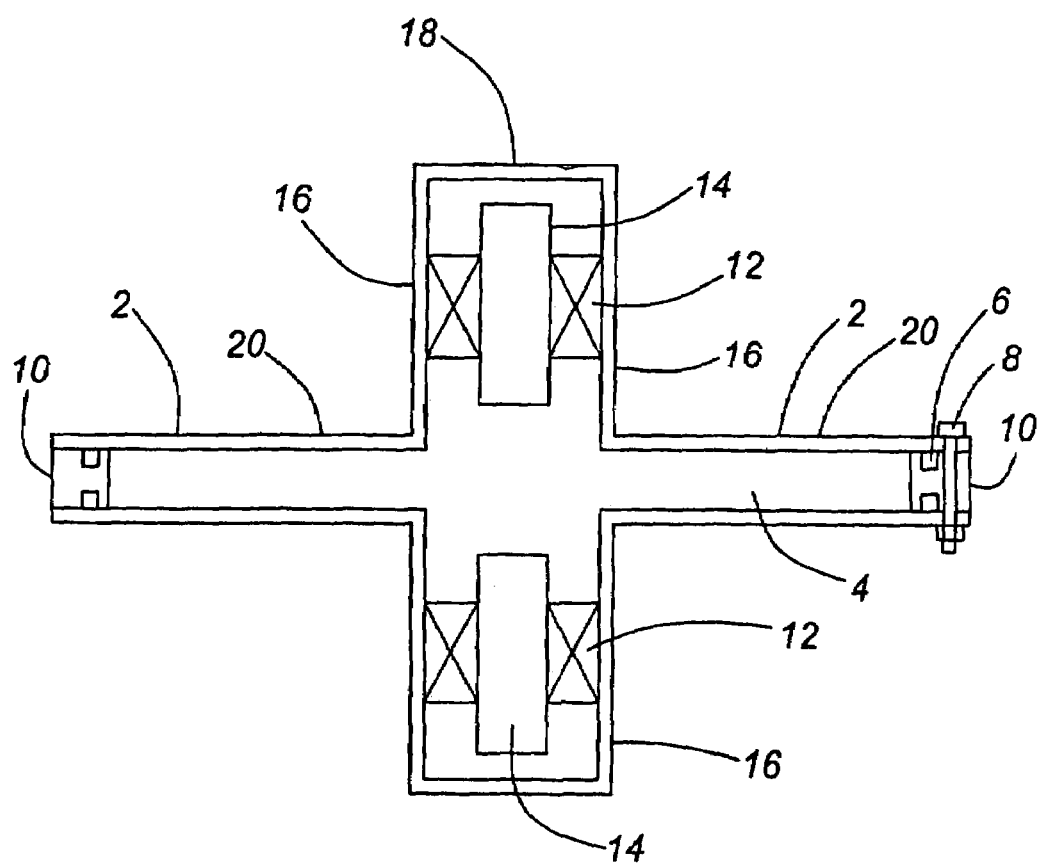
FIG. 1 is a cross-sectional view of the projector according to the present invention.

The low frequency acoustic projector according to the present invention has a pair of electrodynamic drive motors (coils 12 and oscillating masses 14 that move in opposition to each other) that are each inertially coupled to its optimized flexurally radiating surfaces 2 and installed in a pressure compensated cylindrical enclosure formed by surfaces 16 as illustrated in FIG. 1. The spacer ring 10 in FIG. 1 is annular (approximately 19.25" OD, 18.5" ID, and 0.75" thick) and serves to physically separate the sound producing diaphragms 20. It is also the thru-point for electrical conductors 22 (see FIG. 2) that extend through an opening in the spacer ring, the opening being sealed in a waterproof manner. This transducer has a low frequency output of 62 Hz with a bandwidth of 2.5 Hz and is relatively high power, low cost, lightweight, portable, rugged, and shock-tolerant. There is a usable output to over 200 Hz. One prototype weighed 19.4 kg with towing handle and fins attached. The motion of the moving masses 14 is limited by outer ends 18 of pipes 16 in which the masses 14 are located close ends of tubular pipes 16 in 4.32" OD stainless steel discs 18 which the coils 12 and oscillating masses 14 are located.

Using a pair of low cost electrodynamic inertial drive motors 12 to drive the flexural surfaces 2 along their central axis is a novel implementation of the flexural disk transducer concept according to the present invention.

Two prototype versions of this low frequency acoustic projector have been built and tested.

Figure 2:
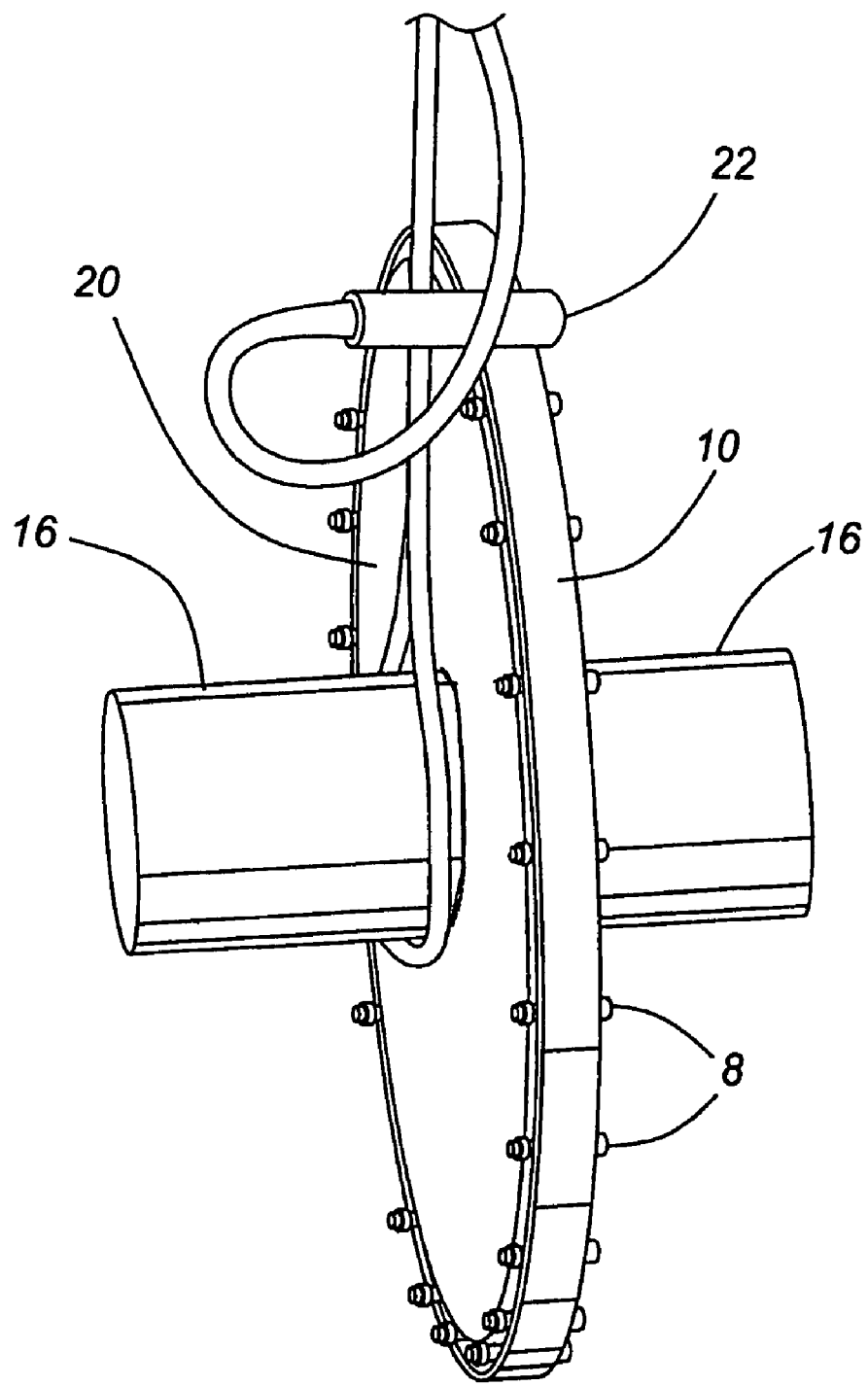
FIG. 2 is a perspective view of the projector illustrated in FIG. 1 rotated 90° from the drawing in FIG. 1.

A first prototype was constructed from mild steel with radiating surfaces being 3.2 mm thick. The radiating surface spacer ring 10 was aluminum. One prototype consisted of two central diaphragms (disc) 20 having a radius of 9.6 inches separated by a cylindrical spacer ring 10 with the two coils 12 and two oscillating mass 14 being located in the space inside of two pipes 16. The spacer ring 10 is attached to diaphragms 20 by bolts 8. A central pipe (tube) 16 having a 4.57 inch outside diameter extends outward 5.50 inches from the center opening of each diaphragm 20, the tubes being open to the space between the diaphragms 20. The outer ends of the tubes are welded closed by a disc with the interior portion of the transducer being pressure compensated with a gas. An O-ring 6 is located at closed ends of the tubes. Power is applied to the coils by a connector 22 extending through and sealed to cylindrical ring 10 as illustrated in FIG. 2.

Possible uses for this projector include underwater loudspeakers, in-air tactile alarm systems, shakers of vibrators. This projector can be used as low frequency small, high source level acoustic projector; in naval sonar, as a naval underwater towed acoustic target, in a naval acoustic minesweeping system and in air deployed underwater sensor systems. A prototype revealed a sound level of approximately 186 dB re 1 μPa@1 m at 62.5 Hz at a depth of 0.2 m when driven at 1000 watts (10 amps at 100 volts rms).

Various modifications may be made to the preferred embodiment without departing from the spirit and scope of the invention as defined in the appended claims.

The invention claimed is:

1. A low frequency acoustic projector containing a pair of drive coils and an associated oscillating mass for each coil, the oscillating masses moving in opposition to one another, a pair of pipes, each of the drive coils and oscillating masses being located in a respective pipe of the pair of pipes, said pipes extending outwardly from a pair of diaphragms that are separated by a spacer ring, outer ends of the pipes being closed by a disc, and the pipes being open to a space between the diaphragms.

2. A low frequency acoustic projector as defined in claim 1, wherein each disc is welded to an outer end of each pipe.

3. A low frequency acoustic projector as defined in claim 2, wherein interior portions of the projector are pressure compensated with a gas.

4. A low frequency acoustic projector as defined in claim 1, wherein an O-ring is located at locations where diaphragms abut the spacer ring.

5. A low frequency acoustic projector as defined in claim 1, wherein electric conductors are connected to the drive coils, the conductors extending in through an opening in the spacer ring, and the opening is sealed in a waterproof manner.

6. A low frequency acoustic projector as defined in claim 4, wherein interior portions of the projector are pressure compensated with a gas.

7. A low frequency acoustic projector as defined in claim 6, wherein electric conductors are connected to the drive coils, the conductors extending through an opening in the spacer ring, and the opening is sealed in a waterproof manner.

8. A low frequency underwater acoustic projector containing a pair of drive coils and an associated oscillating mass for each drive coil, and a pair of pipes, the oscillating masses moving in opposition to one another, the drive coils and oscillating masses being located in a respective pipe of the pair of pipes, the pipes extending outwardly from a pair of diaphragms that are separated by a spacer ring, outer ends of the pipes being closed by a disc, and the pipes being open to a space between the diaphragms.

9. A low frequency underwater acoustic projector as defined in claim 8, wherein electric conductors are connected to the drive coils, the conductors extending through an opening in the spacer ring, and said opening being sealed in a waterproof manner.

10. A low frequency underwater acoustic projector as defined in claim 9, wherein interior portions of the projector are pressure compensated with a gas.

* * * * *